No. 776,627. PATENTED DEC. 6, 1904.
C. UNSICKER.
COMBINED REEL AND POST PULLER.
APPLICATION FILED MAR. 16, 1903.
NO MODEL.
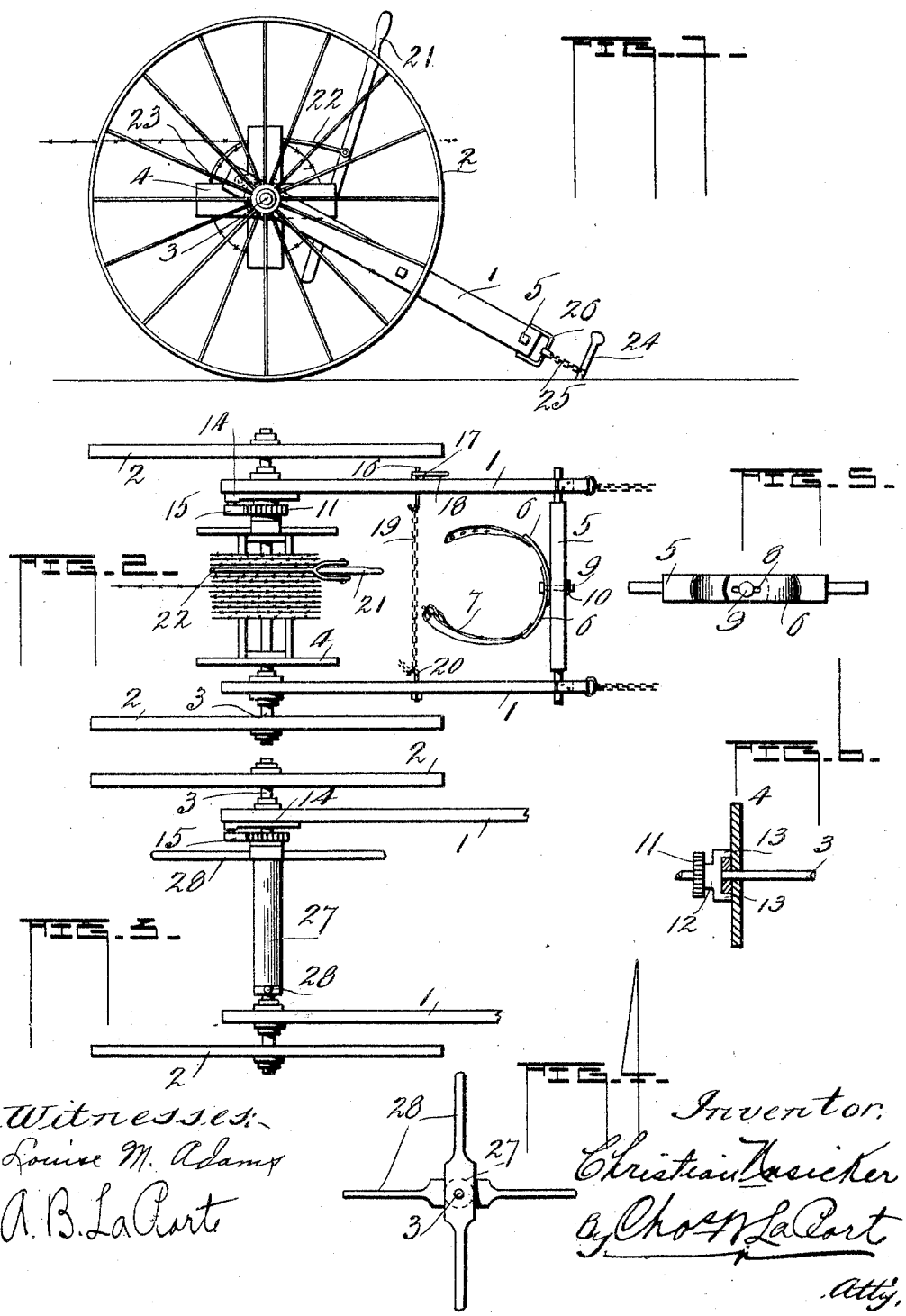

No. 776,627.

Patented December 6, 1904.

UNITED STATES PATENT OFFICE.

CHRISTIAN UNSICKER, OF DEERCREEK, ILLINOIS.

COMBINED REEL AND POST-PULLER.

SPECIFICATION forming part of Letters Patent No. 776,627, dated December 6, 1904.

Application filed March 16, 1903. Serial No. 147,982. (No model.)

*To all whom it may concern:*

Be it known that I, CHRISTIAN UNSICKER, a citizen of the United States, residing at Deercreek, in the county of Tazewell and State of Illinois, have invented certain new and useful Improvements in a Combined Reel and Post-Puller; and I do hereby declare that the following is a full, clear, and exact description of the invention, which will enable others skilled in the art to which it appertains to make and use the same.

This invention has reference to machines for reeling or unreeling wire and to an attachment for pulling posts or similar devices and to stretching mechanism conveniently carried and operated for stretching wire, as is desired.

The object which I have in view is to provide a portable and convertible reeler, unreeler, and fence-post puller which is simple, compact, and light, adapted to be transported with facility to enable a single operator to collect fence-wire, to dispense with or dispose of the reeling mechanism and apply an attachment for pulling fence-posts, and, further, to mechanism for adjusting the tension of the reeling-spool or post-pulling mechanism; and it consists in the peculiar construction and combination of devices that will be more fully set forth hereinafter and particularly pointed out in the claim.

That my invention may be more fully understood reference is to be had to the accompanying drawings, in which—

Figure 1 is a view in side elevation of my machine shown anchored and the stretching mechanism applied. Fig. 2 is a plan of the machine shown in Fig. 1. Fig. 3 is a plan of the forward portion of the machine with the reeling and unreeling mechanism disposed and the post-pulling device shown. Fig. 4 is an elevation, detached, of the post-pulling device. Fig. 5 is a plan of parts shown in Figs. 1 and 2. Fig. 6 is a sectional detail of the manner of retaining the reel or post-puller on its spindle.

The machine embodying my invention preferably includes the side frame pieces or supports 1 and the ground-wheels 2, which are mounted on the axle or spindle 3, suitably journaled in the side frame pieces or supports.

4 refers to a spool or reel of well-known construction arranged to be carried and rotated on the spindle or axle 3, the said axle or spindle adapted to be moved from its bearing to receive the wire-spool or reel 4 when desirable or for the purpose of removing the same when it is desired to substitute the post-pulling mechanism.

Contiguous to the rear extended ends of the frames 1 I have provided the detachable bar 5, upon which is carried the adjustable frame-pieces 6, curved to conform to the body of a person, and from the free ends of each frame 6 is secured straps 7, one end of which is provided with a buckle. The frames 6 are slotted, as at 8, and 9 indicates a retaining stud or bolt which is passed through the slots of the frames and is secured in the bar 5, and by a nut 10 the frames 6 may be moved laterally on each other or brought together, adapted to fit the body of persons of different sizes. The straps are designed to be passed around the body of an operator and buckled, which gives him complete control of the movements of the machine-frame and yet leaves his arms and hands free to operate the spool and such other mechanism as is necessary to the perfect operation of the machine when reeling, unreeling, and stretching wire or pulling posts.

I have provided a ratchet-and-pawl mechanism for holding the spool or reel to its work.

11 refers to a ratchet-wheel carried by a frame 12, having lateral lips 13, adapted to engage the sides of the reel and supported by a casting 14. From the front end of one of the frame parts 1 is a pawl 15, engaging the ratchets of the wheel 11.

The bar 5 has its ends reduced in diameter, thereby forming shoulders at points from the ends of the bar, and upon these reduced ends and normally spaced from the shoulders thereof are mounted the outer ends of the frame ends 1.

I have provided also a tension mechanism which when actuated will relieve the spool of all tension and allow the same to be revolved freely or will cause the frame 1 to bear against the spool to prevent a too free rotation thereof, and especially when unreeling wire, in which case the pawl is disengaged from the teeth of the ratchet-wheel. This is accomplished by means of a threaded rod 16 passing through one of the frames 1 and engaged by a nut 17, and 18 is a hand-lever for rotating the rod 16. To the inner end of the rod 16 is attached a chain or similar device 19, that is designed to be caught on a loop 20, attached to the opposite frame 1. By turning the lever 18 the frame-bars 1 1 are caused to frictionally bear against the spool or reel, or not, as may be desired. This rod is carried in a position contiguous to the position of the operator and just at the rear of the reel or spool, as shown.

It is desirable in a portable machine of this character to provide wire-stretching mechanism for use when the machine is used for distributing fence-wire, and in this connection I have provided a very simple and effective stretching mechanism comprising a lever 21, provided with the grappling-hook 22, having the engaging end 23, which is arranged to engage the cross-bars of the reel or the strands of the wire wrapped thereon. It is also intended to use this lever for reeling up wire unless the extensions of the frame of the reel are used as a lever for turning the same.

Before applying the stretching device or apparatus, as there will be more or less pull and strain on the frame, I secure a rod 24 in the ground, as shown in Fig. 1, and attach to it chains 25, having their free ends caught in loops or plates 26 of the rear ends of the frames 1, which anchors the frame in position, when the lever 21 may be applied as herein for stretching wire, and the ratchet-and-pawl arrangement will retain the parts in adjusted positions.

Attention is now called to the post-pulling device when the reeling device is converted from a reel to a post-puller.

27 is a drum adapted to take the place of the reel on the spindle 3, having the oppositely-disposed levers or arms 28 from opposite ends thereof. To this the ratchet-wheel and frame carrying the same may be attached in manner similar as to the reel, and by the use of a rope, chain, or cable wound around the drum and caught around a post, stump, or other device the drum may be rotated by an operator through the arms or levers 28 for pulling up such device.

The device herein illustrated is adapted to many kinds of work and is efficient for the purposes described, and the parts may be modified or varied to suit many needs.

Various forms of reeling and unreeling devices have been offered to the trade; but I know of none that embody the features of this invention or are capable of conversion from a reeler and unreeler to a post-puller.

Having thus fully described my invention, what I claim, and desire to secure by Letters Patent of the United States, is—

In combination with a spindle and the wheels mounted thereon, a reel rotatable on said spindle, a frame having the inner ends of the side rails slidably mounted on said spindle on opposite sides of the reel, the outer ends of said side rails being formed with openings, a bar having reduced ends projecting through the openings of said side rails whereby movement of said side rails is permitted, and means for moving said side rails inwardly for producing a braking action on the reel, said means comprising hooks secured in said opposite side rails, a link chain having its links engaged by said hooks, one of said hooks having a threaded shank projecting entirely through the adjacent side rail, and a hand-lever in threaded engagement with said threaded shank.

In testimony whereof I affix my signature in presence of two witnesses.

CHRISTIAN UNSICKER.

Witnesses:
 AUGUST NAFFZIGER,
 DANIEL RICH.